United States Patent

Simko

[11] 4,239,023
[45] Dec. 16, 1980

[54] FUEL INJECTION SYSTEM FOR DUAL COMBUSTION CHAMBER ENGINE

[75] Inventor: Aladar O. Simko, Dearborn Heights, Mich.

[73] Assignee: Ford Motor Company, Dearborn, Mich.

[21] Appl. No.: 967,555

[22] Filed: Dec. 7, 1978

[51] Int. Cl.³ .............................................. F02B 3/00
[52] U.S. Cl. .................................... 123/275; 123/286
[58] Field of Search ................. 123/326, 32 SP, 32 F

[56] References Cited

U.S. PATENT DOCUMENTS

| | | | |
|---|---|---|---|
| 2,914,043 | 11/1959 | Nallinger | 123/32 SP |
| 3,990,413 | 11/1976 | Pischinger | 123/32 G |
| 4,034,733 | 7/1977 | Noguchi | 123/32 SP |
| 4,162,664 | 7/1979 | Fleming | 123/32 G |

*Primary Examiner*—Ronald B. Cox
*Attorney, Agent, or Firm*—Robert E. McCollum; Clifford L. Sadler

[57] ABSTRACT

FIG. 1 shows a fuel injection system for an engine having main and prechamber combustion chambers 14 and 22 and separate fuel injectors 18 and 26 supplied from a common source fuel line 50 through a shuttle valve assembly 30. FIG. 3 shows the shuttle valve assembly including a plunger 136 movable by fuel pressure in line 50 and inlet 106 to unseat a ball valve 142 and pressurize a chamber 126 and a line connected to prechamber injector 26 to inject fuel first through the prechamber injector 26 and then through the main injector 18 only after termination of injection through the injector 26 by a seating of the ball valve 142 against a seat 138 to close the chamber.

5 Claims, 5 Drawing Figures

FUEL INJECTION SYSTEM FOR DUAL COMBUSTION CHAMBER ENGINE

This invention relates in general to a fuel injection system for an internal combustion engine. More particularly, it relates to one having twin combustion chambers with separate fuel injectors supplied with fuel from a common source.

Engine constructions are known in which each cylinder is provided with twin or divided combustion chambers, such as a prechamber and a main combustion chamber. For example, U.S. Pat. No. 3,924,584, Decker, shows in FIG. 1 a single cylinder having a prechamber 5 and a main combustion chamber 4 interconnected and each supplied separately with fuel through nozzles 12 and 11. However, the nozzle 11 injects fuel into the manifold upstream of the inlet valve 10, and no control is shown for selectively supplying fuel to the nozzles 11 and 12. U.S. Pat. No. 4,009,688, Hayashida et al, shows a rotary engine having prechamber and main combustion chambers and fuel injectors for each, and a common fuel supply for the two injectors. However, the supply is not such that fuel is supplied initially to the prechamber injector and after termination to the prechamber supplied to the main chamber. U.S. Pat. No. 3,990,413, Pischinger, shows in FIG. 1 an engine cylinder having a prechamber 16 and a main combustion chamber, and a pair of fuel injectors 15 and 8. However, the injector 8 supplies fuel to the manifold on the upstream side of the inlet valve and not to the main combustion chamber. The reference does show a single fuel supply initially supplying fuel to the manifold and subsequently to the precombustion chamber.

It is an object of this invention to provide a fuel injection control system for supplying fuel to the fuel injection nozzle or injector for a pair of combustion chambers from a single source in a manner to first supply fuel to the prechamber and upon termination of fuel flow thereto to supply fuel to the main combustion chamber, if needed to satisfy engine requirements.

It is a further object of the invention to provide a fuel injection system for an internal combustion engine having twin combustion chambers; i.e., a prechamber interconnected to a main combustion chamber to provide ignition of the charge in the main combustion chamber by a flame from the prechamber, each chamber having a fuel injector supplied with fuel from a common source by means of a shuttle valve assembly that determines from the quantity of fuel to be injected to inject fuel first through the prechamber injector and to inject any remaining fuel necessary beyond the capacity of the prechamber into the main chamber injector upon termination of injection from the prechamber.

Other objects, features and advantages of the invention will become more apparent upon reference to the succeeding detailed description thereof, and to the drawings illustrating the preferred embodiments thereof; wherein, FIG. 1 schematically illustrates a cross-sectional view of portions of a single cylinder internal combustion engine construction embodying the invention;

The diesel engine, which in effect is a compression ignition fuel injection stratified charge engine, has been developed during the past decades in two forms, direct injection and prechamber injection. The outstanding feature of the direct injection concept is its excellent fuel economy. In terms of emission control, however, the main difficulties with the direct injection diesel are HC control at light load and $No_x$ control at heavier loads. Prechamber diesel engines, however, excel in both HC and $No_x$ control down to light loads, but their fuel economy trails behind that of the direct injection engine due to heat and flow losses.

Fuel economy and emission characteristics of experimental spark ignition stratified charge engines imitating both the direct injection and the prechamber diesel engine layouts follow quite closely the trends observed on their diesel counterparts. Specifically, the direct injection stratified charge engines tested exhibited good fuel economy and emission control at medium and heavier loads. At light load, the indicated specific fuel consumption in these engines was significantly higher than predicted by thermodynamic analysis, indicating that the combustion of the small quantity of fuel in the very large combustion chamber is poor, incomplete, and inefficient. This observation is supported by the fact that the specific HC emission at light load was very much higher than at heavier loads.

Experiments with precombustion chamber stratified charge engines indicated that efficient combustion and good HC control was obtainable with relatively small fuel quantities as long as the prechamber volume was also small. This invention combines the direct injection and the prechamber concepts in order to achieve good HC emission control and good fuel economy as well as high air utilization and power output throughout a wide operating range.

Experiments show that when ignition is initiated in a direct fuel injection type engine by a flame torch instead of a conventional spark plug, the combustion is substantially accelerated. This leads to potential improvements in HC, CO, and $No_x$ emissions as well as improvement in fuel economy by virtue of assuring good combustion under lean air/fuel ratio conditions without the need to induce high air turbulence. A practical problem with the above scheme is the fueling of the prechamber in such a manner that the fuel introduced in this prechamber does not dispurse into the main chamber prior to flame initiation. A feasible method of fueling which satisfies this requirement is the injection of fuel into the prechamber during the compression stroke.

Figure 1:
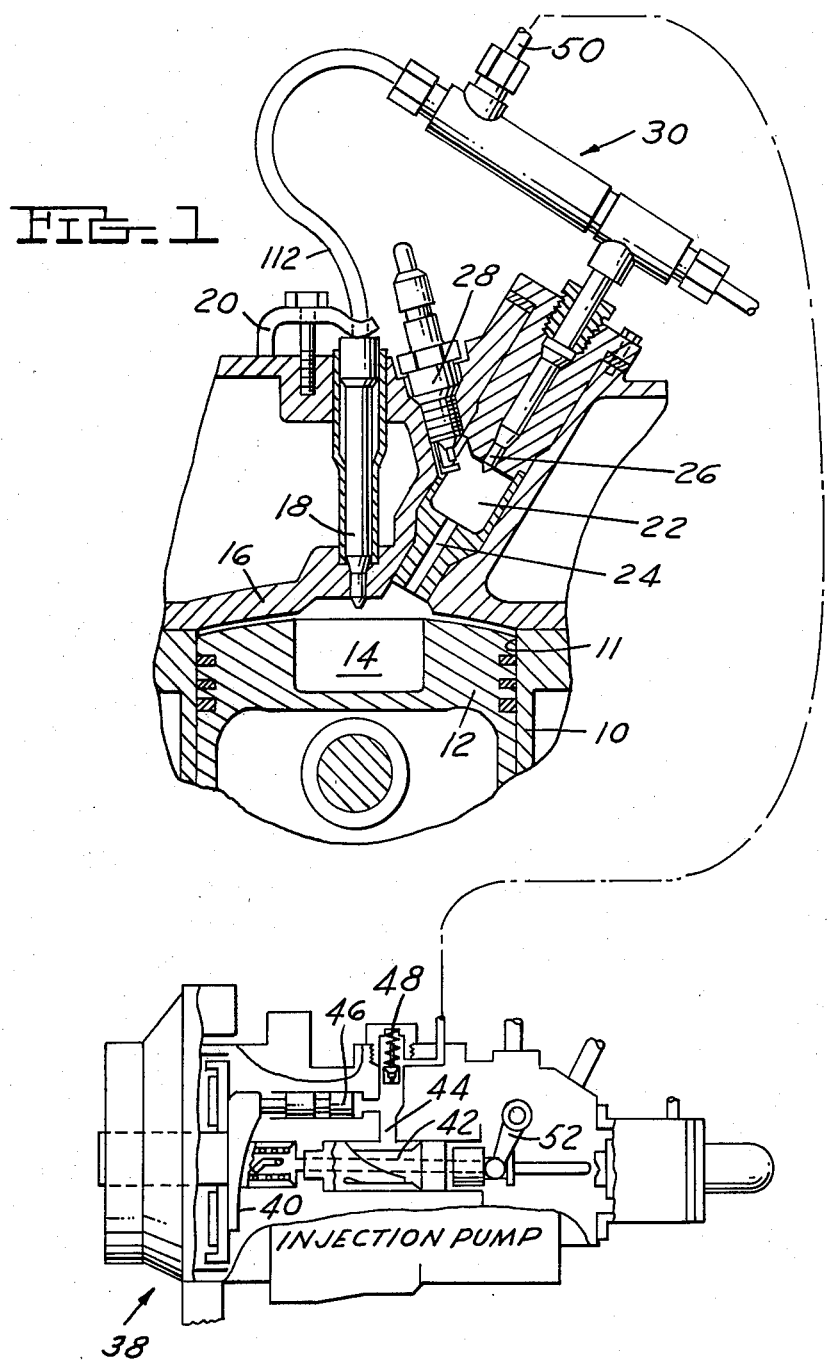

FIG. 1 shows a cross sectional view of a combustion chamber construction with fuel injection into a prechamber as well as fuel injection into the main chamber. Single cylinder experiments indicate good operability when the prechamber is fueled with a fixed small quantity of fuel injected about 40°–80° BTDC. Fuel injection into the main chamber should occur nearer to TDC for best emission control. The quantity of fuel injected into the main chamber is controlled as a function of power requirement.

This invention proposes a practical way to satisfy the fueling requirements of the prechamber as well as of the main chamber with the utilization of a fuel injection pump having a retraction type delivery valve and a control system including a shuttle valve to preschedule fuel flow to the main and prechamber combustion chambers.

FIG. 1 illustrates schematically only those portions of a fuel injection type internal combustion engine to which the control system of the invention relates, as the details and construction of the remaining parts of the engine are known and believed to be unnecessary for an understanding of the invention.

More specifically, the Figure shows a portion of a cylinder block 10 having a bore 11 in which a piston 12 is mounted for reciprocation. Formed in the top of the piston is a swirl type main combustion chamber indicated schematically at 14. The chamber is defined in part by a cylinder head 16 through which is mounted a main chamber fuel injector 18. The injector is fixed in place by a holddown yoke 20.

The cylinder head is formed with a prechamber or torch type combustion chamber 22 that is connected to main chamber 14 by a nozzle or flame passage 24. A prechamber fuel injector 26 supplies the prechamber with fuel. This fuel when combined with squish air from the main combustion chamber during the compression stroke is ignited by a spark plug 28. The resultant flame or torch is discharged through the passage or nozzle 24 into the main chamber 14 to ignite the fuel supplied by injector 18 and mixed with the air in the chamber.

As stated previously, the fuel supplied to both prechamber and main chamber injectors issues from a single source, controlled selectively by a shuttle valve device indicated in general at 30.

The fuel supplied to both injectors is, in this case, provided by an engine driven fuel injection pump 38 of the plunger type shown here only schematically but shown and described fully in my copending application U.S. Ser. No. 928,213. The pump has a cam face 40 that is contoured to match fuel pump output with the mass air flow characteristics of the engine for all engine speed and load conditions of operation so a constant air/fuel ratio to the mixture charge flowing into the engine combustion chamber 16 will be maintained at all times. The pump has an axially movable fuel metering sleeve valve helix 42 that cooperates with a spill port 44 to block the same at times for a predetermined duration to thereby permit the output from the plunger 46 of the pump to build up in pressure against a delivery valve 48 to open the same and supply fuel to an output line 50. Axial movement of the helix 42 by a fuel control lever 52 will vary the base fuel flow output by moving the helix to block or unblock a spill port 44 for a different duration of time.

Figure 2:
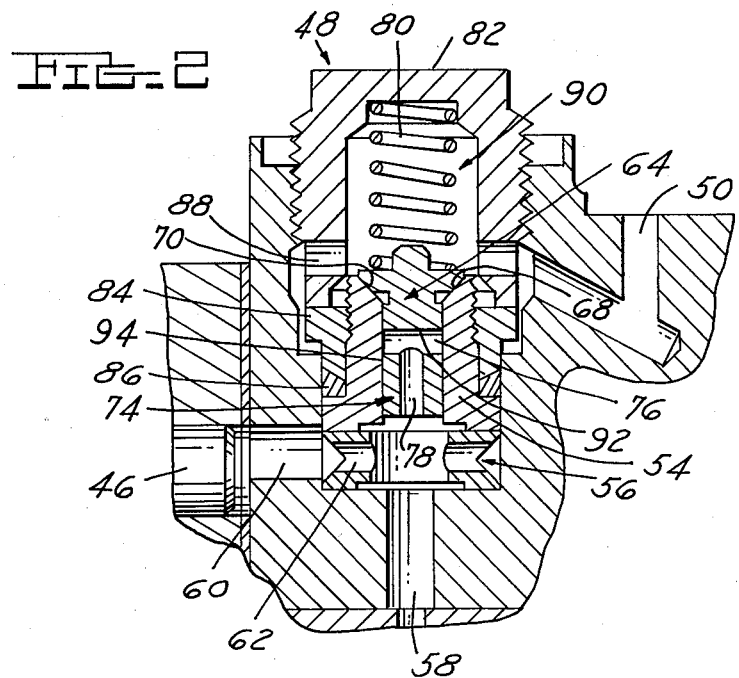
FIGS. 2 and 3 are enlarged cross-sectional views of details of FIG. 1.

As seen more clearly in FIG. 2, the delivery valve 48 includes a stationary valve body portion 54 that seats on a spacer 56 located in the intersection of a pair of passages 58 and 60. The spacer 56 has a pair of intersecting through bores 62 to provide communication between the passages, and has an axial opening to flow fuel through and past a retraction type valve 64. The body portion 66 of the delivery valve has a conical seat 68 on its upper end. The latter cooperates with the spherical surface 70 of the retraction type delivery valve 64 that is slidably and sealingly mounted in a bore portion 74. The retraction valve has a cross bore or hole 76 intersected by a supply passage 78 connected to the spacer passages. A spring 80 biases the retraction valve to its closed or seated position shown.

The delivery valve has a cover portion 82 that is threaded to body portion 66 to compress a spacer 84 against an annular seal 86. The cover is provided with a cross bore 88 that discharges into the output line 50 (FIG. 1) leading to the shuttle valve device 30.

When the helix 42 of the fuel injection pump 38 rotates to cover the spill port 44, the pressure buildup by the axial movement of pump plunger 46 to the right as seen in FIG. 1 causes the pressure acting against the bottom of the retraction valve 64 to exceed the force of spring 80 and move the valve upwardly or open. Immediately upon the pressure in the cross hole 76 being exposed to the passage 88 upon passing the conical seat portion 68, the force of the fuel pressure will be applied against the increased exposed area of the spherical seat of the valve causing an immediate increase in pressure in chamber 90 and injection of the fuel into output line 50.

When the fuel pump metering sleeve valve helix 42 moves away from the spill port 44, and the plunger 46 begins to retract towards the left as seen in FIG. 1, the fuel in chamber 90 is drawn back into the pump plunger cavity 80 through the cross hole 76 and through the spill port 44 until the force of spring 80 in the delivery valve is sufficient to move the retraction valve 64 downwardly. As soon as the upper edge 92 of the cross hole 76 enters the bore 94 defined by the valve seat body 54, further drain of fuel into either line 58 or 78 is stopped. However, the retraction valve 64 will continue to move downwardly until the spherical valve seat 70 engages the conical seat 68. This further movement withdraws part of the mass of the valve from the chamber 90 and thus decreases the effective pressure in chamber 90 to prevent afterdribbling or secondary injection into the combustion chambers.

Figure 3:
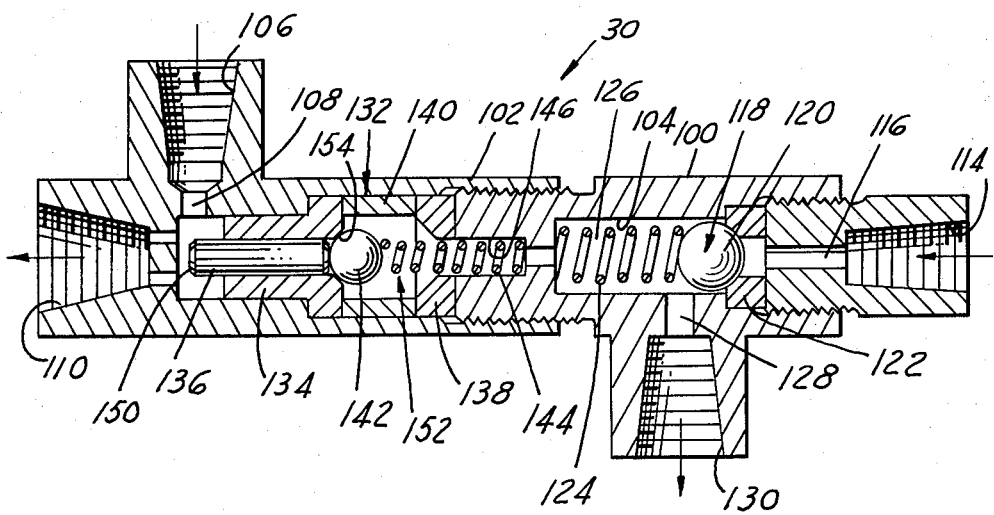

FIG. 3 is an enlarged cross-sectional view of the fuel control shuttle valve assembly 30 shown in general in FIG. 1. More particularly, it includes a two piece valve body 100, 102 having a central axially extending throughbore 104. The latter is defined by a number of stepped diameter portions. A first fuel inlet 106 at one end is connected to the pump output line 50 and connected to bore 104 by an intersecting passage 108. The bore 104 also is contiguous with a first fuel outlet 110 which, as seen in FIG. 1, is connected by tubing 112 to the main combustion chamber fuel injector 18.

The opposite end of the shuttle valve assembly includes a second fuel inlet 114 adapted to be connected to a low pressure fuel supply pump, not shown, that would have an essentially constant output pressure of approximately 25 to 35 psi, for example. The inlet 114 passes fuel through a passage 116 past a one-way check valve 118. The latter includes a ball valve member 120 engageable with a member formed with a seat 122 to shut off fuel inflow past the ball valve 120. The ball valve is seated by a spring 124 located in a chamber 126 defined by an enlargement of the bore 104. Chamber 126 is connected by a passage 128 to a second fuel outlet 130 connected as shown in FIG. 1 to the prechamber combustion chamber fuel injector 26.

Located in the bore 104 between the two outlets 106 and 130 is a shuttle valve plunger mechanism 132. It consists of a stepped diameter sleeve 134 slidably and sealingly receiving a plunger 136. Sleeve 134 is axially spaced from ball valve seat element 138 by a sleeve 140. A ball valve 142 normally is held contiguous to the plunger 136 by a biasing spring 144 seated in a reduced diameter 146 of bore 104.

Before proceeding to the operation, it should be noted that the fuel injectors 18 and 26 would be of known or conventional constructions such as, for example, is shown in U.S. Pat. No. 3,542,293, Bishop et al, wherein a tension spring prevents opening of the injector valve until a predetermined fuel pressure level is reached. In effect, the valve and spring constitute a pressure relief valve. In this case, the fuel injector for the prechamber 22 would be set to open at a 200-230 psi fuel pressure, whereas the main chamber fuel injector 18 would be set to open at approximately 440-470 psi fuel pressure.

In operation, when the fuel injection pump 38 discharges fuel under pressure past delivery valve 48 to output line 50 and inlet 106, it flows simultaneously through outlet 110 to the main chamber fuel injector 18 and also acts against the end 150 of plunger 136. This moves the plunger rightwardly, as seen in FIG. 3, against the force of spring 144 to unseat the ball valve 142 and begin moving the ball valve rightwardly. The chamber 152 in this case constitutes a pressurization control chamber in that rightward movement of the plunger and ball will raise the fuel pressure in chamber 152 and in the connecting passages to outlet 130 to the prechamber fuel injector 26. Continued pressure against the plunger end 150 will continue to pressurize the fuel to the prechamber fuel injector until the opening pressure level of 200-230 psi is reached, at which time the injector 26 will open and fuel will be injected into the prechamber 22.

The duration of injection will be determined solely by the duration of output from the fuel injection pump 38 in that at light loads, where only a small volume of fuel is needed, only a small volume will be injected out into the output line 50. This volume may be sufficient to move the ball valve 142 only partially across the pressurization chamber 152, for example. The maximum stroke or fuel output to the prechamber is determined by the axial extent of the spacer 140 in that continued delivery of fuel to the inlet 106 will eventually cause the plunger 136 to move the valve 142 against its seat 138. At this moment, further fuel flow towards and into the prechamber combustion chamber will be blocked and pressure rise will be terminated.

As the fuel injection pump 38 continues to displace fuel into the line 50 and inlet 106, the fuel pressure will continue to rise until it reaches the opening pressure of 440-470 psi of the main chamber fuel injector 18. From this time on, fuel will be injected into the main chamber as long as fuel is being displaced by the fuel injection pump 38.

After the end of fuel displacement at the pump 38, its retraction valve 64 (FIG. 2) will withdraw about 45 cubic milliliters, for example, fuel from the output line 50 resulting in a pressure drop in the inlet 106 down to approximately 10-20 psi. As the pressure drops on the upstream end 150 of plunger 136, the return spring 144 will force leftward movement of the plunger until the ball 142 reaches its upstream seat 154. This movement results in a resetting of the plunger to its initial position. During this resetting, the pressure inside the prechamber fuel injector 26 will drop to a low level because of the void created by the resetting movement of the plunger 136. However, this void will be instantly refilled with fuel from the supply pump through the inlet 114 past the check valve assembly 118. The end result is that during the unloading of the pump fuel injection line 50, the plunger 136 will be reset to its base or initial position and the pressure in the prechamber injector 26 will be normalized to the level of the supply pressure in inlet 114.

As stated previously, it will be seen that the amount of fuel injected into the prechamber is controllable by the axial extent or length of the spacer 140 which sets the maximum stroke of plunger 136 by limiting the movement of the ball valve 142. Experience shows that the required fuel injection quantity for the prechamber is between 15-50% of the total fuel quantity required to overcome the engine friction. This means that under all operating conditions, the fuel will be injected both into the prechamber 22 and into the main chamber 14, and that fuel flow will first occur to the prechamber and only after termination of the flow to the prechamber will fuel be injected into the main chamber.

Figure 4:
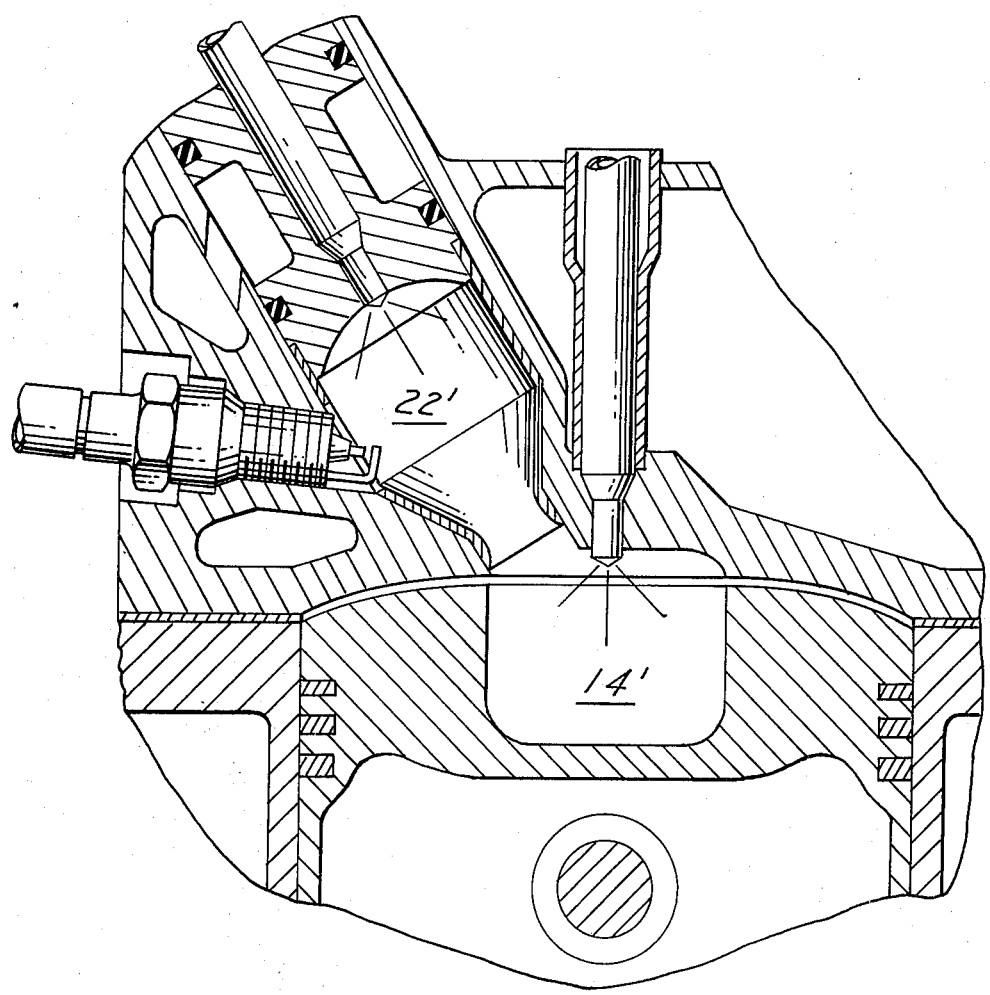
FIG. 4 is a cross-sectional view similar to the showing in FIG. 1 and illustrating a modified embodiment of the invention; and, FIG. 5 is a view similar to the FIG. 3 showing and illustrating a further embodiment of the invention.

It will also be clear that shuttle valve assembly 30 can also be utilized with other combinations of prechamber and main chamber constructions, such as, for example, that shown in FIG. 4 wherein the volume of the prechamber 22 is 20-35% of the total clearance volume of the engine. In this latter case, at idle and at light loads, fuel would be injected into the prechamber only, whereas at heavier loads fuel would also be injected into the main chamber 14. This would result in very low HC emissions under idle and light load operation. In this particular application, the stroke of the shuttle plunger 136 shown in FIG. 3 would be set to satisfy the maximum fuel requirement of the prechamber 22′. At idle and light loads, when the total fuel requirement is less than that which corresponds to the maximum flow quantity defined by the maximum stroke of the shuttle plunger 136, the shuttle plunger would travel less than a full stroke and no fuel would be injected into the main chamber 14′. Resetting of the shuttle plunger after injection would take place in the same manner as previously described in connection with the FIG. 3 and FIG. 1 embodiments.

Figure 5:
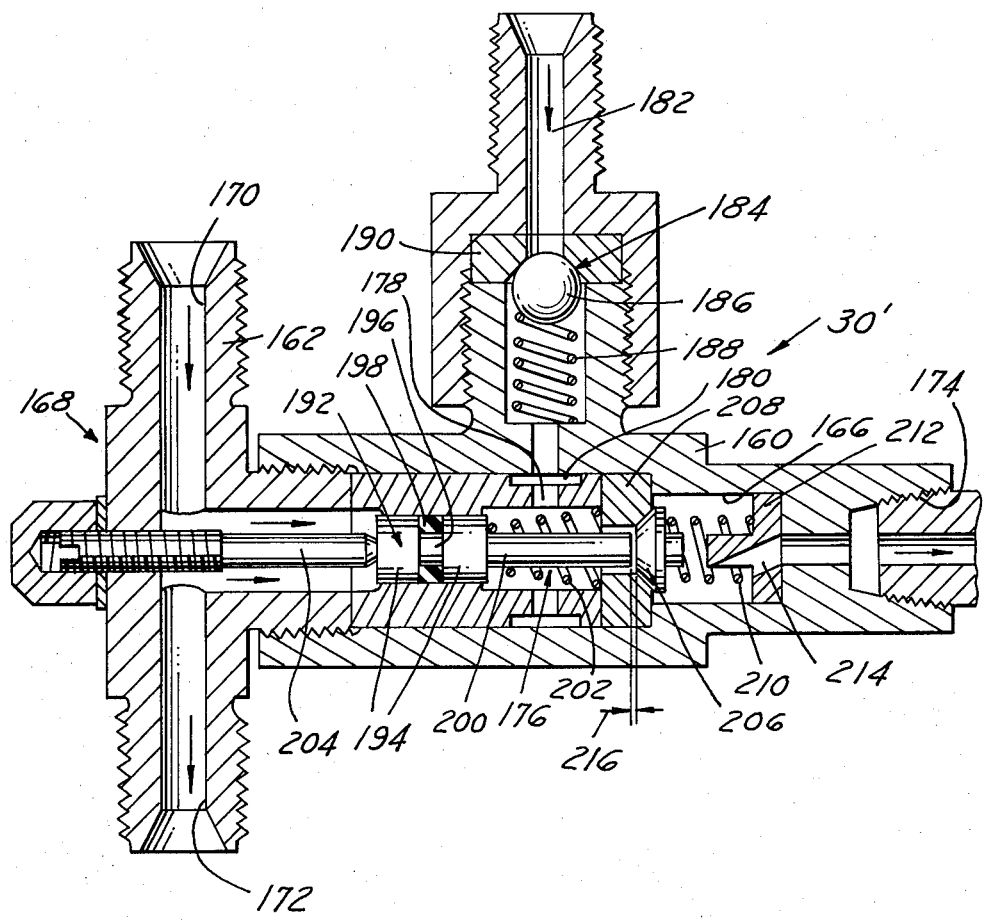

FIG. 5 shows another embodiment of the invention illustrating a modified version 30′ of the shuttle valve assembly 30. Again, the assembly includes a two-piece housing 162, 164 having a central axially extending throughbore 166 with a teed connection 168 at one end. The latter connection constitutes an inlet 170 for fuel from the fuel injection pump output line 50 and a first outlet 172 connected to the main chamber fuel injector 18.

The opposite end of the assembly includes a second outlet 174 connected to the prechamber fuel injector 26. Again, the assembly includes a fuel pressurization chamber 176 that is connected by a passage 178 and an annulus 180 to a fuel supply line 182 delivering fuel at an essentially constant pressure level of between 25-35 psi. A one-way check valve assembly 184 again is provided consisting of a ball valve 186 and a spring 188 to bias the valve against an annular seat 190. Drop of pressure in chamber 176 will cause an opening of the ball valve under the pressure of the supply pump fuel to refill the pressurization chamber at the same pressure level.

In this case, the plunger 136 shown in FIG. 3 is replaced by a spool type retraction valve plunger 192. It has a plurality of lands 194 interconnected by a neck portion 196 of reduced diameter defining an annulus in which is located a seal 198. Connected to the rightward end land is a stem or plunger 200 that projects through the fuel pressurization chamber 176. The plunger valve is biased leftwardly by a reset or return spring 202 to seat against a stroke adjustment screw 204. The plunger 200 is normally spaced from but cooperates with an outlet valve 206 of the mushroom or button type biased against a seat 208 by a spring 210. The spring is seated against a stop 212 having a through passage 214.

In operation, as the pressure rises in the fuel injection pump output line 50, the plunger 192 will begin moving rightwardly thereby raising the pressure in the prechamber fuel injector 26 until it opens and injects fuel through it. Rightward movement of the plunger 192 will first engage the outlet valve 206 and move it against the force of its spring 210 to open the same. This will pressurize the fuel in chamber 216 and connecting lines to the fuel injector 26. Injection will commence and continue until either the fuel injection pump 50 terminates the supply of fuel to the inlet 170 or the outlet valve 206 is moved against the stop means 212 thereby reaching its travel limitation and preventing further movement of plunger 192. This will terminate further fuel injection into the prechamber. However, continued pressure rise in inlet line 170 will raise the pressure in the main fuel injector 18 to its opening level resulting in injection through the main injector into the main combustion chamber 14.

Upon completion of injection from the pump 50, the pressure will drop in line 50, as stated previously, to approximately 10–20 psi. As the pressure is reduced, the prechamber injector 26 will close and the plunger reset or return spring 202 will force the plunger 192 leftwardly at the same time that the outlet valve 206 is being forced leftwardly by its return spring 210. This results in a lowering of the residual pressure in the prechamber fuel injector 26 until the outlet valve 206 seats and effects a near leak-proof seal between the prechamber injector 26 and the pressurization chamber 176. From this point on, further leftward movement of plunger 192 continues until it reaches the adjustable stop screw 204. This particular travel portion provides a clearance 216 between the plunger end and valve 206 and constitutes the suction or intake stroke during which the inlet ball check valve 184 will open to refill chamber 176 with fresh fuel. The drop in pressure in this chamber occurs because of the retraction of a portion of the mass of plunger 192 into the bore of the valve body, thereby increasing the volume of the chamber and decreasing the residual pressure. At this point, therefore, the prechamber injector system is reset to a start or base position, ready for the next cycle of injection when the pressure from the main fuel injection pump 38 begins to rise.

It will be seen from the above that the retraction for the prechamber fuel injector is performed by the plunger 192 itself, and that the amount of retraction is controlled by the stroke of the outlet valve 206. The amount of fuel injected is controlled by the adjustment of the plunger backstop screw 204 in combination with the amount of retraction of plunger 192. Injected fuel quantity control can also be effected during engine operation by replacing the plunger backstop screw 204 with a suitable spring, for example. In this latter case, the suction stroke of the plunger could be increased by raising the supply pressure in inlet 182 that feeds the chamber 176. Higher supply pressure would force a longer suction stroke on the plunger 192 thereby increasing the fuel quantity that would be injected in the subsequent forward stroke upon pressurization of the fuel injection pump output line 50.

While the invention has been shown and described in its preferred embodiments, it will be clear to those skilled in the arts to which it pertains that many changes and modifications may be made thereto without departing from the scope of the invention.

I claim:

1. A fuel injection system for an internal combustion engine having main and prechamber combustion chambers and main and prechamber fuel injectors operable respectively at higher and lower fuel pressure levels to sequentially inject fuel into the respective chambers, passage means connecting the main and prechamber chambers for the ignition of the mixture in the main chamber from the mixture in the prechamber, and spark ignition means operably associated with the prechamber for igniting the air/fuel mixture therein, the system including an engine driven fuel injection pump having a fuel output line intermittently opened and closed to discharge into the line a controlled quantity of fuel that varies as a function of the changes in engine speed and load, conduit means connecting the output line in parallel flow relationship to the main and prechamber fuel injectors, and shuttle valve means in the conduit means operably to control the supply of fuel to the main and prechamber fuel injectors as a function of the duration of supply of fuel from the output line, the shuttle valve means including a valve body having a first fuel input connected to the output line and a second fuel input connected at one end to a makeup supply source of fuel at a lower pressure level than the output line and connected at an opposite end to a fuel pressurizing control chamber, means connecting the control chamber to the prechamber injector for opening of the prechamber injector upon pressurization of the control chamber to the lower pressure level, plunger means movably associated with the control chamber and movable into the latter chamber in response to a pressure increase in the output line to above a predetermined level to pressurize the control chamber and render operable the prechamber injector to inject fuel in an amount that progressively increases as a function of the duration of injection in the output line.

2. A fuel injection system for an internal combustion engine having main and prechamber combustion chambers and main and prechamber fuel injectors operable respectively at higher and lower fuel pressure levels to sequentially inject fuel first into the prechamber and subsequently into the main chamber, passage means connecting the main and prechamber chambers for the ignition of the mixture in the main chamber from the mixture in the prechamber, and spark ignition means operably associated with the prechamber for igniting the air/fuel mixture therein, the system including an engine driven fuel injection pump having a fuel output line intermittently opened and closed to discharge into the line a controlled quantity of fuel that varies as a function of the changes in engine speed and load and includes a retraction valve in the line operable upon closure of the line to retract a predetermined volume of fuel from the line to reduce the residual pressure in the line, conduit means connecting the output line in parallel flow relationship to the main and prechamber fuel injectors, and shuttle valve means in the conduit means operably to control the supply of fuel to the main and prechamber fuel injectors as a function of the duration of supply of fuel from the output line, the shuttle valve means including a shuttle valve device having a fuel pressurization chamber, one-way check valve means controlling the supply of fuel from a source to the pressurization chamber, a plunger valve means movable from a first position by the fuel under pressure in the output line acting thereagainst to pressurize the fuel in the pressurization chamber to the lower pressure level to effect injection of fuel through the prechamber injector, stop means to limit the stroke of the plunger valve means in a second position to limit the pressurization of the pressurization chamber and prechamber injector injection duration, and means to reset the plunger valve means to the first position upon termination of pressure buildup in the output line and retraction of a portion of the fuel from the output line reducing the residual pressure in the output line, the resetting of the plunger valve means reducing the pressurization chamber pressure to open the check valve means to resupply the pressurization chamber with fuel.

3. A system as in claim 1, including stop means to limit the movement of the plunger means and terminate injection through the prechamber injector, subsequent further increase in pressure in the output line to the high pressure level opening the main chamber injector to inject fuel into the main combustion chamber by an amount that varies as a function of the duration of injection into the output line.

4. A system as in claim 1, including stop means operable to limit the movement of the plunger means and limit fuel pressurization in the control chamber to terminate injection of fuel past the prechamber injector, the duration of injection past the prechamber injector prior to movement of the plunger into engagement with the stop means varying in direct proportion to the duration of fuel delivery into the output line.

5. A fuel injection system for an internal combustion engine having main and prechamber combustion chambers and main and prechamber fuel injectors operable respectively at higher and lower fuel pressure levels to sequentially inject fuel first into the prechamber and subsequently into the main chamber, passage means connecting the main and prechamber for the ignition of the mixture in the main chamber from the mixture in the prechamber, and spark ignition means operably associated with the prechamber for igniting the air/fuel mixture therein, the system including an engine driven fuel injection pump having a fuel output line intermittently opened and closed to provide in the line a controlled quantity of fuel that varies as a function of the changes in engine speed and load, conduit means connecting the output line in parallel flow relationship to the main and prechamber fuel injectors, and shuttle valve means in the conduit means operable to control the supply of fuel to the main and prechamber fuel injectors as a function of the duration of supply of fuel from the output line, the shuttle valve means including a shuttle valve device having a fuel reservoir connected to the prechamber injector, a low pressure fuel supply source connected to the reservoir to supply fuel at times to the reservoir from a source other than the fuel output line, and control means movable in response to a pressure rise in the output line to pressurize the reservoir in direct proportion to the pressurization of the output line to inject the fuel in the reservoir past the prechamber injector upon the reservoir pressure level attaining the lower pressure level, the control means terminating pressurization of the reservoir and injection of the fuel past the prechamber injector prior to an increase in output line pressure to the higher pressure level rendering operable the main injector while continuing pressurization of the output line to the higher pressure level to render operable the main injector.

* * * * *